US009676625B1

(12) United States Patent
Petrie et al.

(10) Patent No.: US 9,676,625 B1
(45) Date of Patent: Jun. 13, 2017

(54) SYNTHESIS OF MICROCRYSTALLINE ALPHA ALANE

(71) Applicants: Mark A. Petrie, Santa Clara, CA (US); David Stout, Palo Alto, CA (US); Paul E. Penwell, Sausalito, CA (US); Sigridur Suman, Hayward, CA (US); Allen Dodge, Newark, CA (US)

(72) Inventors: Mark A. Petrie, Santa Clara, CA (US); David Stout, Palo Alto, CA (US); Paul E. Penwell, Sausalito, CA (US); Sigridur Suman, Hayward, CA (US); Allen Dodge, Newark, CA (US)

(73) Assignee: Ardica Technologies, Inc., San Francisco, CA (US)

( * ) Notice: Subject to any disclaimer, the term of this patent is extended or adjusted under 35 U.S.C. 154(b) by 245 days.

(21) Appl. No.: 13/671,090

(22) Filed: Nov. 7, 2012

Related U.S. Application Data

(60) Provisional application No. 61/556,738, filed on Nov. 7, 2011.

(51) Int. Cl.
| | | |
|---|---|---|
| *C01B 6/00* | (2006.01) | |
| *C06B 27/00* | (2006.01) | |
| *H01M 4/13* | (2010.01) | |
| *H01M 4/58* | (2010.01) | |
| *C01B 6/06* | (2006.01) | |
| *H01M 10/26* | (2006.01) | |
| *H01M 8/065* | (2016.01) | |

(52) U.S. Cl.
CPC .............. *C01B 6/06* (2013.01); *H01M 8/065* (2013.01); *H01M 10/26* (2013.01)

(58) Field of Classification Search
None
See application file for complete search history.

(56) References Cited

U.S. PATENT DOCUMENTS

| | | | |
|---|---|---|---|
| 3,032,037 A | 5/1962 | Havirco et al. | |
| 3,129,163 A | 4/1964 | Stern et al. | |
| 3,184,528 A | 5/1965 | Norwalk et al. | |
| 3,801,657 A | 4/1974 | Scruggs | |
| 3,801,707 A | 4/1974 | Ardis et al. | |
| 3,810,974 A | 5/1974 | King | |
| 3,812,244 A | 5/1974 | Schmidt et al. | |
| 3,816,192 A | 6/1974 | Brower et al. | |
| 3,819,335 A | 6/1974 | Daniels et al. | |
| 3,819,819 A | 6/1974 | Matzek et al. | |
| 3,821,044 A | 6/1974 | Roberts | |
| 3,823,226 A | 7/1974 | Brower et al. | |
| 3,826,820 A | 7/1974 | Roberts et al. | |
| 3,838,194 A | 9/1974 | Reigler et al. | |
| 3,838,195 A | 9/1974 | Reigler et al. | |
| 3,840,654 A | 10/1974 | Schmidt et al. | |
| 3,843,774 A | 10/1974 | York et al. | |
| 3,850,709 A | 11/1974 | Schmidt | |
| 3,857,930 A | 12/1974 | Kraus et al. | |
| 3,869,544 A | 3/1975 | Niles et al. | |
| 3,869,545 A | 3/1975 | Terada et al. | |
| 3,883,644 A | 5/1975 | Matzek et al. | |
| 4,006,095 A | 2/1977 | Hoffman et al. | |
| 4,048,087 A | 9/1977 | Daniels et al. | |
| 4,370,294 A | 1/1983 | Franken et al. | |
| 4,395,219 A | 7/1983 | Franken et al. | |
| 4,747,701 A | 5/1988 | Perkins | |
| 5,292,387 A | 3/1994 | Highsmith et al. | |
| 5,670,129 A | 9/1997 | Klapdor et al. | |
| 5,730,952 A | 3/1998 | Rathman et al. | |
| 6,228,338 B1 | 5/2001 | Petrie et al. | |
| 6,617,064 B2 | 9/2003 | Petrie et al. | |
| 7,238,336 B2 | 7/2007 | Lund et al. | |
| 7,521,037 B1 | 4/2009 | Graetz et al. | |
| 9,228,267 B1 | 1/2016 | Crouch-Baker | |
| 9,327,974 B1 | 5/2016 | Petrie | |
| 2001/0038821 A1 | 11/2001 | Petrie et al. | |
| 2006/0249393 A1 | 11/2006 | Ghosh et al. | |
| 2007/0056970 A1 | 3/2007 | Scherer et al. | |
| 2008/0216906 A1 | 9/2008 | Curello et al. | |
| 2009/0038954 A1 | 2/2009 | Zidan | |
| 2009/0291045 A1 | 11/2009 | Graetz et al. | |
| 2010/0252444 A1 | 10/2010 | Vajo et al. | |
| 2012/0017439 A1 | 1/2012 | Yamamoto et al. | |
| 2012/0141363 A1 | 6/2012 | Zidan et al. | |
| 2016/0115602 A1 | 4/2016 | Crouch-Baker et al. | |
| 2016/0297678 A1 | 10/2016 | Stout et al. | |
| 2016/0368768 A1 | 12/2016 | Stout et al. | |

FOREIGN PATENT DOCUMENTS

| | | |
|---|---|---|
| DE | 10392795 T5 | 6/2005 |
| GB | 833646 | 4/1960 |
| GB | 2281059 | 2/1995 |
| WO | WO2012018640 | 2/2012 |

OTHER PUBLICATIONS

Finholt, A. E. et al., "Lithium Aluminum Hydride, Aluminum Hydride and Lithium Gallium Hydride and Some of Their Applications in Organic and Inorganic Chemistry," J. Am. Chem. Soc., 69:1199-1203, May 1947.

(Continued)

*Primary Examiner* — Susannah Chung
*Assistant Examiner* — Robert T Butcher
(74) *Attorney, Agent, or Firm* — Carr & Ferrell LLP

(57) ABSTRACT

Systems and methods for producing microcrystalline alpha alane are provided herein. An exemplary process for producing microcrystalline alpha alane includes reacting lithium aluminum hydride and aluminum chloride in a solvent to produce alane etherate, filtering alane etherate from the reactant, combining the filtered alane etherate with a lithium borohydride solution to produce solids that include microcrystalline alane etherate, removing remaining solvent from the solids, creating a slurry from the solids and an aromatic solvent, and heating the slurry to convert the microcrystalline alane etherate to microcrystalline alpha alane.

15 Claims, 2 Drawing Sheets

(56) References Cited

OTHER PUBLICATIONS

Brower, F. M. et al., "Preparation and Properties of Aluminum Hydride," Journal of the American Chemical Society, 98(9):2450-2453. Apr. 28, 1976.
International Search Report and Written Opinion mailed Jan. 17, 2012 in Patent Cooperation Treaty Application No. PCT/US2011/045407, filed Jul. 26, 2011.
Non-Final Office Action, Sep. 30, 2015, U.S. Appl. No. 13/671,067, filed Nov. 7, 2012.
Notice of Allowance, Feb. 3, 2016, U.S. Appl. No. 13/671,067, filed Nov. 7, 2012.
Notice of Allowance, Aug. 31, 2015, U.S. Appl. No. 13/671,122, filed Nov. 7, 2012.
Non-Final Office Action, Sep. 20, 2016, U.S. Appl. No. 13/671,079, filed Nov. 7, 2012.

SYNTHESIS OF MICROCRYSTALLINE ALPHA ALANE

CROSS REFERENCE TO RELATED APPLICATIONS

This non-provisional U.S. patent application claims priority benefit of provisional U.S. patent application Ser. No. 61/556,738, filed on Nov. 7, 2011, which is hereby incorporated by reference herein in its entirety.

GOVERNMENT LICENSE RIGHTS

This invention was made with government support under contract number W909MY-08-C-0031 awarded by the U.S. Army. The U.S. Government has certain rights in the invention.

FIELD OF THE INVENTION

The present technology may be generally described comprising methods for producing microcrystalline alpha alane.

BACKGROUND

Methods for macrocrystalline alane synthesis are inefficient for producing large quantities of aluminum hydride ($AlH_3$), also known as alane. These methods are problematic when production of a specific alane polymorph is required, such as alpha-alane ($\alpha$-alane). The large amounts of solvent required as described in the patent literature for the synthesis of the alpha polymorph of alane hinder the large-scale production of this material by these routes. Material and capitol equipment costs can be reduced by a dramatic reduction in solvent for this process. Various methods that reduce the required amount of solvent are disclosed herein.

SUMMARY OF THE PRESENT TECHNOLOGY

According to some embodiments, the present technology may be directed to methods that comprise: (a) reacting lithium aluminum hydride and aluminum chloride in a solvent to produce alane etherate; (b) filtering alane etherate from the reactant; (c) combining the filtered alane etherate with a lithium borohydride solution to produce a solution that includes alane etherate; (d) removing most or all of the remaining solvent; (e) creating a slurry from the solids and an aromatic solvent; and (f) heating the slurry to convert the alane etherate to microcrystalline alpha alane.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

DESCRIPTION OF EXEMPLARY EMBODIMENTS

Figure 1:
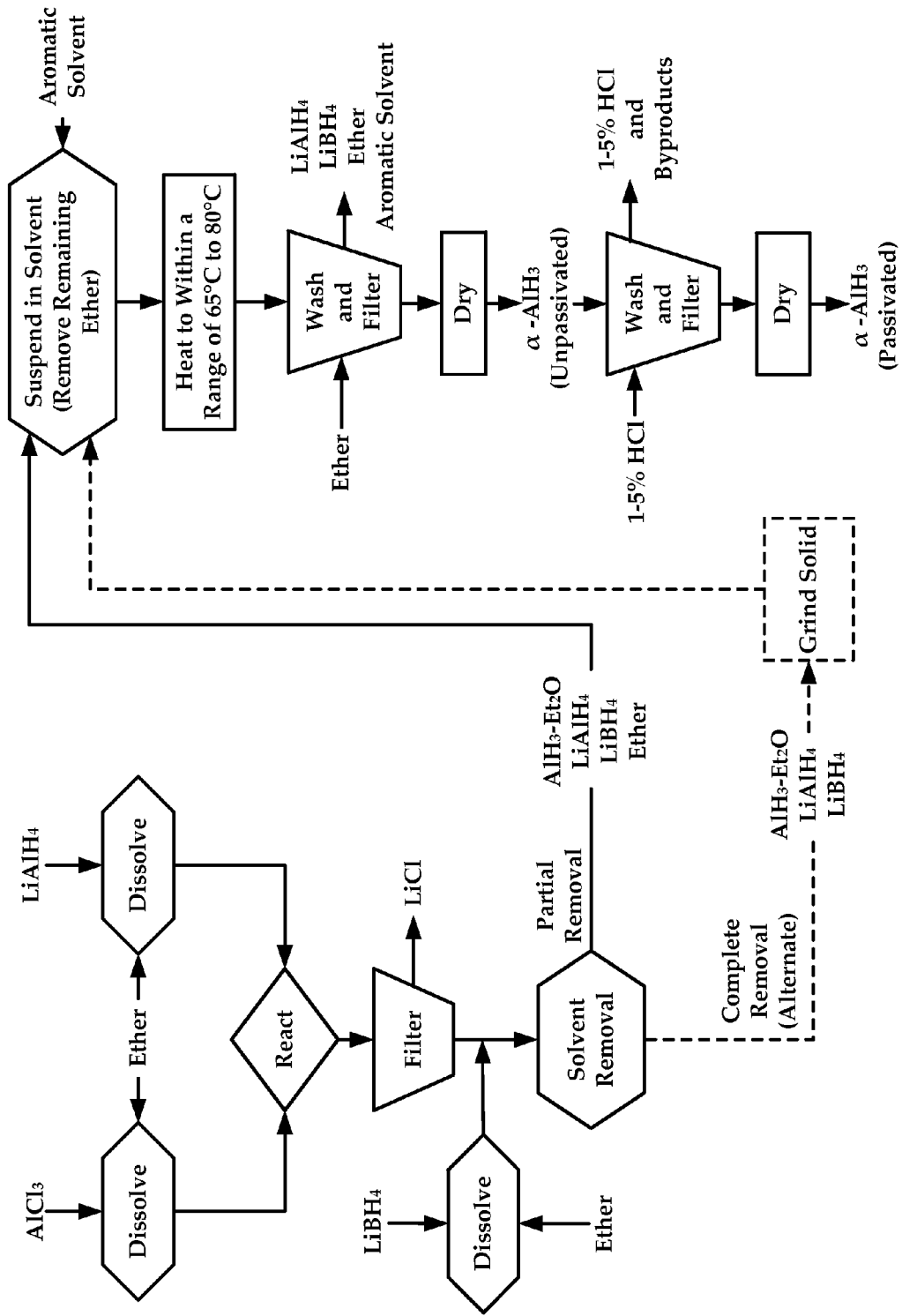
FIG. 1 is a flow diagram of an exemplary process for synthesizing microcrystalline alpha alane.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

Additionally, ranges described or claimed herein are inclusive of their end points. Moreover, the end points are inclusive of suitable fluctuations allowing for reasonable and approximate values that fall near end points.

Generally speaking, the present technology may provide systems and processes for synthesizing microcrystalline alpha alane. In some embodiments, exemplary processes included combining lithium aluminum hydride ($LiAlH_4$) with an amount of aluminum trichloride ($AlCl_3$) in an ether solvent to produce lithium aluminum hydride, lithium chloride, and alane etherate. Next, the lithium chloride is precipitated and filtered leaving a solid composition of alane etherate and lithium aluminum hydride. This solid may be further processed to remove and purify the alane. In some instances, the solids may be heated to separate the alane from the alane etherate.

It is noteworthy that alane etherate is sensitive to temperature. Thus, uneven or incomplete heating may result in the decomposition of alane etherate into aluminum and hydrogen gas, which produces a potentially volatile and flammable product. Additionally, heating may cause the alane etherate to transform into various polymorphs. The transformation of alane into its various polymorphs may be undesirable when alpha alane synthesis is the desired goal.

To remedy uneven heating and the aforementioned resultant deleterious effects, the solids may be combined with a solvent such as toluene to produce a slurry. When heat is applied to the slurry the toluene allows the heat to be evenly distributed throughout the slurry, reducing the decomposition of alane into aluminum and polymorphs.

Processes described herein use dramatically lower amounts of solvent compared to the current route used for synthesis of macrocrystalline $\alpha$-alane. Alane synthesis experiments described in greater detail herein were designed to provide more information on the route to microcrystalline alane. Exemplary processes described herein allow for production of large quantities of microcrystalline alane. Several parameters such as temperature, time, solvent and concentration were varied to investigate their effect on the process.

The highest purity starting materials were utilized in these experiments and included: (1) lithium aluminum hydride in 1.0 M diethyl ether; (2) aluminum chloride, 99.99%; and (3) lithium borohydride, 99.5%, combined together in a solvent such as diethyl ether. The diethyl ether is dried from sodium metal. Toluene may be dried over molecular sieves. For reference, FIG. 1 is a flow diagram of an exemplary process used for alane synthesis.

The first step of the synthesis involves the addition of a solution of aluminum trichloride ($AlCl_3$) to lithium aluminum hydride ($LiAlH_4$) in diethyl ether to generate alane etherate ($AlH_3$-$Et_2O$) in solution and lithium chloride precipitate. This reaction solution was initially held at ambient temperature during the formation of the solution and subsequent filtration. Since the $AlH_3$-$Et_2O$ has limited solubility at ambient temperature at the concentration (approximately 0.8 M) of these experiments, we observed premature crystallization of alane etherate during filtration. The solubility of alane etherate has an inverse relationship to temperature, and keeping the reaction temperature at within a range of approximately −5° C. to 0° C. using an ice-water salt bath reduced premature crystallization.

Following filtration, a solution of lithium borohydride dissolved in 1.0 M of diethyl ether is added to the filtered mixture. The next step involves the removal of most of the diethyl ether solvent by vacuum distillation. After removal of approximately all visible solvent and pumping under high vacuum for an additional time frame (which in some instances ranges from approximately two to three hours), the remaining solid material of approximate composition $LiAlH_4/4AlH_3$ and $1.2Et_2O/LiBH_4$ may be a bright white powder material. This solid material may be ground using a mortar and pestle and transferred into a separate flask for heating. Several separate experiments were preformed where only 80-90% of the diethyl ether was removed giving a slurry of the $LiAlH_4/4AlH_3$ $Et_2O/LiBH_4$ mixture in a minimal amount of diethyl ether.

Heating of this solid mixture to a temperature that falls within a range of approximately 60° C. to 65° C. for a period of time of approximately four hours and in the presence of a vacuum, converts the alane etherate into α-alane and other products.

Empirical data suggests that heating of the solid mixture resulted in uneven heating, which leads to mixtures of products being formed. As mentioned above, uneven heating may result in decomposition of alane into aluminum and hydrogen gas, as well as the formation of various alane polymorphs.

Thus, the process includes a step of combining the solid or diethyl ether slurry mixture with a solvent such as toluene ($C_7H_8$). The distribution of solids throughout the toluene allows for better distribution of heat throughout the sample. Advantageously, even distribution of heat during the heating cycle provides efficient transformation of the alane etherate into α-alane.

According to some embodiments, if the slurry is heated to a temperature that falls within a range of approximately 70° C. to 72° C., over a period of time of approximately six hours, larger quantities of α-alane are produced relative to heating the slurry to less than approximately 70° C. In other embodiments, the slurry may be heated to a temperature that falls within a range of approximately 72° C. to 80° C., over a period of time of approximately six hours. It will be understood that as the temperature increases, the length of the heating cycle may decrease. This temperature is approximately 20° C. lower than used for known methods of producing macrocrystalline α-alane, thus significantly reducing energy costs.

After heating, the solid may be rinsed with diethyl ether, which dissolves the more soluble excess lithium aluminum hydride and lithium borohydride. The material left behind is "microcrystalline alpha phase alane."

Alane Synthesis (20-g Batch)

This batch used a single pot 20-g scale-up reactor apparatus. The apparatus enables rapid filtration of alane etherate solutions, more efficient temperature control, and the ability to work at a higher solvent load (approximately 1.2 L) required for the 20-g scale. The safety of the synthesis procedure is also greatly improved. For example, methods that use unevenly distributed heating methods may produce decomposed alane, which results in reactive aluminum and hydrogen gas, which are volatile materials.

The lithium aluminum hydride used for this procedure included purified 95% material. The solid from the dry box was loaded into a 1 L flask and dissolved using approximately 800 mL of diethyl ether. This mixture was then transferred into a 2 L jacketed reactor assembly. The solution was stirred by an overhead stirrer and cooled to approximately −8° C. using a recirculating bath unit. The aluminum chloride (approximately 26.6 g) was dissolved in approximately 200 mL of diethyl ether. This mixture was then added into the reactor over a time frame of approximately five minutes and combined with the cooled lithium aluminum hydride solution. Lithium chloride precipitate appeared immediately and settled rapidly when stirring terminates.

Immediately after addition the solution was filtered into a flask under the reactor over approximately five minutes time. The flask containing the clear filtrate was then disconnected from the reactor unit and the approximately 4.34 g of lithium borohydride, which has been pre-dissolved in approximately 350 mL of diethyl ether was added into the reactor. The diethyl ether was removed via trap-to-trap distillation under vacuum pressure. Any remaining solvent was removed under dynamic vacuum of approximately 0.02 torr for a period of time of approximately seventeen hours.

The final mass of the resultant α-alane after transfer and fine grinding was approximately 52.8 g. A 13 g portion of this material was heated at 71° C. for approximately six hours as a stirred suspension in toluene (35 mL), which resulted in a light grey powder after filtration and rinsed three times with 150 mL of diethyl ether each time.

Figure 2:
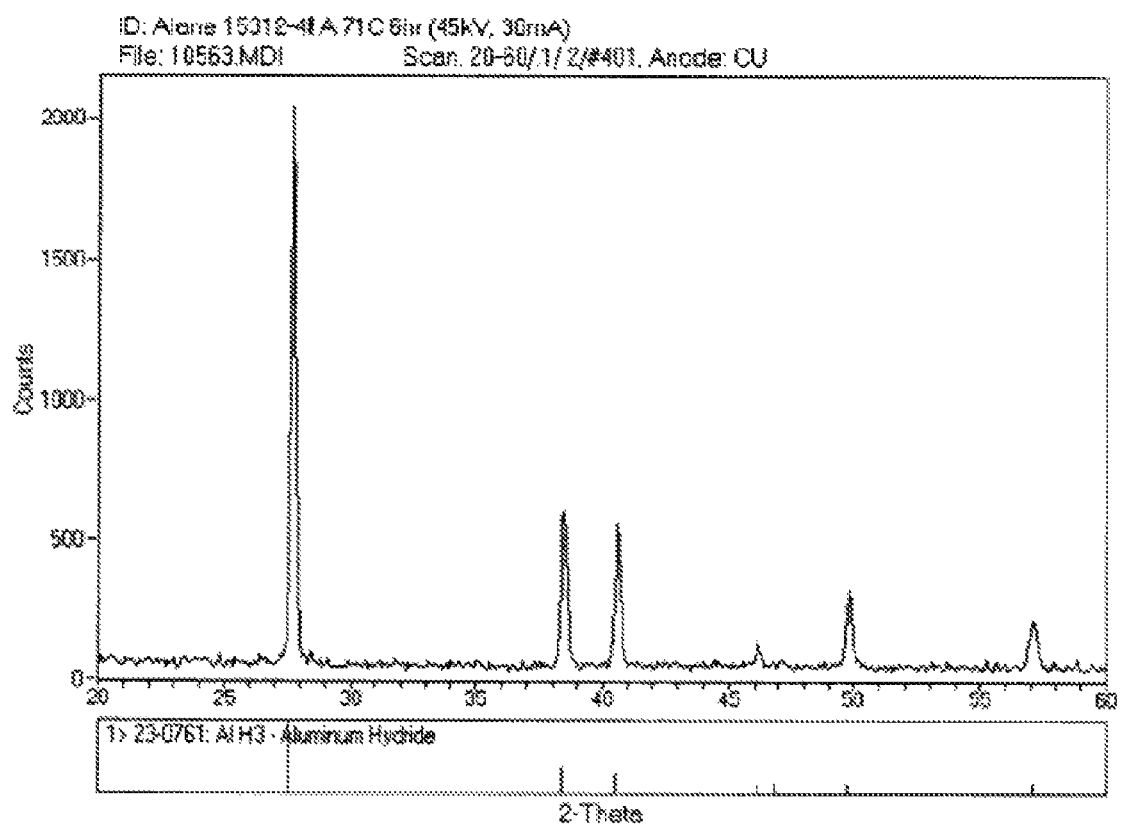
FIG. 2 illustrates an x-ray diffraction analysis of a microcrystalline alpha alane product produced by the process of FIG. 1.

FIG. 2 includes an x-ray diffraction analysis showing all α-alane with no evidence of other alane polymorphs or aluminum metal. Thus, heating of the lithium aluminum hydride, alane etherate, lithium borohydride mixtures as toluene slurries at a temperature of approximately 71° C. transforms the initially formed γ-alane into the alpha phase with no evidence of resultant aluminum metal. Again, the presence of aluminum metal indicates the decomposition of alane.

Alane Synthesis (20-g Batch)

This reaction was performed following the above described procedure and apparatus, and produced approximately 20-g batches of α-alane. A 1.0 M lithium aluminum hydride solution was used. The final mass after the reaction, solvent removal, drying phase, and fine grinding was approximately 53.3 g. This material was heated to approximately 71.4° C. for approximately six hours in toluene and gave a light-grey powder after rinsing with three times in 300 mL of diethyl ether and drying on a glass filter frit. The yield of non-passivated material was approximately 22.5 g. X-ray diffraction analysis showed all α-alane with no evidence of other polymorphs or aluminum metal in the mixture. Differential scanning calorimetry (DSC) and thermogravimetric analysis (TGA) both show an aliquot of the non-passivated material, which shows a single endothermic DSC peak at approximately 169° C. and a weight loss of approximately 8.8% starting at 151° C.

Alane Synthesis (Heating in Minimal Diethyl Ether/Toluene)

This preferred method demonstrates that taking the diethyl ether to dryness and grinding the solid is not required for successful transformation to high quality microcrystalline α-alane. This reaction was performed following the above described procedure and apparatus, and produced approximately 20-g batches of α-alane. A 1.0 M lithium aluminum hydride solution was used. Approximately one quarter of the diethyl ether solution of $LiAlH_4/4AlH_3$ $Et_2O/LiBH_4$ was separated and reduced in volume under vacuum to remove ~75-90% of the diethyl ether. The diethyl ether slurry was combined with ~110 ml of toluene. This slurry was subjected to a slight vacuum at ambient temperature (20-25° C.) to remove most of the remaining diethyl ether. After heating the solid mixture in mostly toluene at ~75° C. over 5 hours, the grey solid was rinsed with three times with 50 mL of diethyl ether and dried under vacuum. The un-passivated grey solid weighed ~6.0 g. In order to passivate the α-alane for long term stability, the material was poured directly into a 1% hydrochloric acid solution. Sparks or evolution of hydrogen were not observed during the addition. The acid slurry was stirred ~2 min. and the grey solid isolated by filtration and washed with water and ethanol and air-dried. Yield is ~5.3 g of a light grey solid. X-ray diffraction analysis of the passivated solid showed all α-alane with no evidence of other polymorphs or aluminum metal in the mixture. Differential scanning calorimetry (DSC) and thermogravimetric analysis (TGA) both show that the passivated material, gives a single endothermic DSC peak at approximately 168° C. and a weight loss of approximately 9.3% starting at 150° C.

Removing the diethyl ether to a minimal level while maintaining a diethyl ether slurry of the solid $LiAlH_4/4AlH_3$ $Et_2O/LiBH_4$ mixture allows ease of transfer of the solution on an industrial scale and removes the need to grind the solid mixture as described in the previous experimental descriptions.

Allowing a portion of the diethyl ether solvent to remain during the heating phase in toluene results in more control over particle size distribution, ease of passivation and higher hydrogen content of the micorcyrstalline alpha alane.

According to some embodiments, it will be understood that increasing temperatures to a range of approximately 72° C. to 80° C. may facilitate more rapid transfer alane etherate to α-alane.

Additionally, rinsing and filtering of remaining lithium borohydride and lithium aluminum hydride from the toluene slurry provides α-alane in microcrystal form. The microcrystal form of α-alane, comprises an enhanced surface area, which provides for enhanced reactivity of the alane. This enhanced reactivity may be reduced via passivation.

Passivation may occur by introducing the microcrystals into a non-aqueous solvent such as dimethoxyethane. In some instances, the slurry of microcrystals and non-aqueous solvent may be combined into a low concentration acidic solution such as between 1 to 5% hydrochloric acid. The microcrystals may also be added directly to the acid solution. This process passivates the surface of the microcrystals by creating an aluminum oxide coating on the surface of the alane. Also, the hydrochloric acid destroys more reactive polymorph alanes as well as residual lithium borohydride and lithium aluminum hydride. Passivated alane is safer to handle than the more reactive alane. Additionally, passivated alane has a longer shelf life compared to un-passivated alane that also can contain impurities that are highly reactive to water and ambient air.

The flowchart and block diagrams in the Figures illustrate the architecture, functionality, and operation of possible implementations of systems and methods according to various embodiments of the present invention. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A method, comprising:
    reacting lithium aluminum hydride and aluminum trichloride in an ether solvent to produce an alane etherate solution comprising alane etherate, lithium aluminum hydride, and lithium chloride precipitate;
    filtering the lithium chloride precipitate from the alane etherate solution;
    removing a portion of the ether solvent from the alane etherate solution to create a slurry, the slurry comprising alane etherate, lithium aluminum hydride, and ether;
    adding approximately 110 milliliters of aromatic solvent per 20 grams of microcrystalline alpha alane expected; and
    heating the slurry to convert the alane etherate to obtain microcrystalline alpha alane.

2. The method according to claim 1, wherein the reacting occurs over a range of temperatures of approximately −15° C. to 0° C., inclusive.

3. The method according to claim 1, further comprising combining the filtered alane etherate solution with a lithium borohydride solution.

4. The method according to claim 1, wherein the heating includes increasing a temperature of the slurry to between approximately 70° C. to 72° C., inclusive, for a given period of time.

5. The method according to claim 1, wherein the heating includes increasing a temperature of the slurry to between approximately 60° C. to 80° C., inclusive, for a given period of time.

6. The method according to claim 1, further comprising rinsing the heated slurry with a solvent and filtering the solvent from the microcrystalline alpha alane.

7. The method according to claim 1, wherein the aromatic solvent is combined with an aliphatic solvent.

8. The method according to claim 1, further comprising passivating the microcrystalline alpha alane by combining the microcrystalline alpha alane with a non-aqueous solvent and an acid to create an aluminum oxide coating on the microcrystalline alpha alane.

9. The method according to claim 1, further comprising passivating the microcrystalline alpha alane by combining the microcrystalline alpha alane directly with an acid and without a non-aqueous solvent, to create an aluminum oxide coating on the microcrystalline alpha alane.

10. The method according to claim 3, further comprising reacting the slurry with an acid to remove alane polymorphs, aluminum metal, and residual lithium borohydride and lithium aluminum hydride.

11. The method according to claim 8, wherein the non-aqueous solvent is an organic solvent miscible with water.

12. The method according to claim 8, wherein the non-aqueous solvent comprises dimethoxyethane and an organic solvent that is miscible with water.

13. The method according to claim 1, wherein the removing a portion of the ether solvent to create a slurry is accomplished by vacuum distillation.

14. The method according to claim 1, wherein the aromatic solvent is a toluene solvent.

15. The method according to claim 1, wherein the removing a portion of the ether solvent to create a slurry comprises removing an amount between 75% to 90% of the ether from the alane etherate solution.

* * * * *